(12) United States Patent
Le Texier et al.

(10) Patent No.: US 8,272,548 B2
(45) Date of Patent: Sep. 25, 2012

(54) SECURED DEVICE FOR A HEADSET SUPPORT

(75) Inventors: Maxime Le Texier, Toulouse (FR); Laurent Saint-Marc, Toulouse (FR); Raphael Renier, Blagnac (FR)

(73) Assignee: Airbus Operations, Toulouse (FR)

( * ) Notice: Subject to any disclaimer, the term of this patent is extended or adjusted under 35 U.S.C. 154(b) by 177 days.

(21) Appl. No.: 12/692,465

(22) Filed: Jan. 22, 2010

(65) Prior Publication Data
US 2010/0200631 A1 Aug. 12, 2010

(30) Foreign Application Priority Data
Jan. 30, 2009 (FR) ...................................... 09 00404

(51) Int. Cl.
*B60R 7/00* (2006.01)
(52) U.S. Cl. ........ 224/570; 224/313; 224/311; 224/545; 224/548; 224/281
(58) Field of Classification Search .................. 224/570, 224/313, 281, 545, 548, 927, 311; 296/214
See application file for complete search history.

(56) References Cited

U.S. PATENT DOCUMENTS

| | | | |
|---|---|---|---|
| 2,258,200 A | | 10/1941 | Baird |
| 3,424,418 A | * | 1/1969 | Freedman et al. ............ 248/304 |
| 4,720,028 A | * | 1/1988 | Takemura et al. ............ 224/553 |
| 5,507,423 A | * | 4/1996 | Fischer et al. ................ 224/313 |
| 5,890,689 A | | 4/1999 | Johnson |
| 6,397,435 B1 | | 6/2002 | Gosselet |
| 6,692,067 B2 | * | 2/2004 | Inari et al. ..................... 296/214 |
| 6,935,601 B2 | * | 8/2005 | Tanaka ....................... 248/294.1 |
| 2002/0113465 A1 | | 8/2002 | Inari et al. |

FOREIGN PATENT DOCUMENTS

| | | | |
|---|---|---|---|
| DE | 29607310 U1 | * | 7/1996 |
| FR | 1163467 A | | 9/1958 |
| FR | 1481309 A | | 5/1966 |
| FR | EP 2213517 A1 | * | 8/2010 |

OTHER PUBLICATIONS

French Search Report and Written Opinion dated Apr. 16, 2009.

* cited by examiner

*Primary Examiner* — Nathan J Newhouse
*Assistant Examiner* — Lester L Vanterpool
(74) *Attorney, Agent, or Firm* — Perman & Green, LLP

(57) ABSTRACT

A device to support a headset along a wall of a vehicle, that includes a hook that has a base to receive a headband of the headset, with this base being intended to be fastened transversally to the wall by its back and being integral at the opposite front with an external element for holding the headband on the base. The hook has on opening between the back and the external element with a width I at least equal to the width of the headband, permitting the passage of the headband toward the base or during removal from the base. The aforementioned device has an anti-release element blocking the opening over a width at least large enough to prevent the passage of the headband through the opening. This anti-release element can be displaced by manual action directly on the anti-release element or through the headset into a release position to allow the passage of the headband.

9 Claims, 3 Drawing Sheets

SECURED DEVICE FOR A HEADSET SUPPORT

CROSS-REFERENCE TO RELATED APPLICATIONS

This application claims priority to and the benefit of French Application No. 09 00404 filed on 30 Jan. 2009, the disclosures of which are incorporated herein by reference in its entirety.

SUMMARY

This aspects of the disclosed embodiments are in the field of devices used for a headband headset support on a structure when the headset is not in use. The disclosed embodiments are more particularly applied to support such headsets on structures of vehicles subject to strong vertical accelerations and/or vibrations that are capable of causing the headset to be ejected out of the support.

The preferred field of application of the disclosed embodiments, which will be described more precisely in the present description, are that of aircraft. However, the disclosed embodiments are also applicable in the same way to any other vehicle that may be subjected to vibrations, for example such as lumber yard vehicles.

The disclosed embodiments also apply to both audio headsets and anti-noise headsets, or to any other type of headset equipped with a headband used in vehicles.

On vehicles, more particularly on aircraft, the pilots use a radio headset to permit them to communicate with the rest of the crew and the air traffic controllers, while remaining insulated from the outside noise for better hearing quality. Since the pilot has to put on and take off his radio headset occasionally on the ground and/or in flight, this headset is preferably hung close to the pilot, but without interfering with the access of the pilot to his control units and to the control panels, and without its being able to fall off or being difficult to retrieve when the pilot needs it.

The headset is preferably hung on a support located on the cockpit covering, preferably in an area at the height of the pilot's head when he is seated.

To hang up and hold the headset, the existing supports used on board aircraft are generally supports of the coat hook 100 type made of metal or composite material, for example as shown in FIG. 1.

However, these supports may prove to be inadequate to assure the holding of the headset when the aircraft is subjected to vertical accelerations and/or turbulence since the headset may be ejected from the support at this moment and fall into a place that is more or less accessible by the pilot from his seat, or in an inopportune situation the headset may even fall onto the pilot himself or onto the on-board equipment, causing possible trouble when particular attention by the pilot is recommended during these phases of flight.

The goal of the aspects of the disclosed embodiments is to improve the piloting conditions for the pilot during the flight and to assure accessibility to the headset under all circumstances, primarily during turbulence and/or strong vertical accelerations.

To do this, it proposes a device to support a headset along a wall of a vehicle that has a hook with:
a base to receive a headset headband intended to be attached transversally to the wall by a rear end, and integral, at an opposite front end, with an external element to hold said headband on said base, and an opening, between the rear end of the base and the external holding element, with a width I at least equal to a width of the headband, permitting the headband to pass through toward the base or away from the base.

Said device has an anti-release element blocking the opening over a width at least large enough to prevent the passage of the headband through the opening. This anti-release element can be displaced by manual action, directly on the anti-release element or through the headset, into a release position to allow the passage of the headband through said opening.

This anti-release element advantageously blocks the headset headband in its position supported by the hook, until a sufficiently great intentional force is exerted on it to free the opening. It is advantageously configured so as to resist transient shocks exerted on it by the headset shaken by motions of the vehicle. The headset is thus held permanently on the hook. It is always readily accessible to the user and there is no risk of it impeding the pilot during the piloting operations by being ejected from the hook to anywhere in the cockpit.

In an example of embodiment, the anti-release element is a tongue extending essentially parallel to the base.

In preferred embodiments of the disclosed embodiments, the anti-release element can be folded toward the base to free the opening for the passage of the headband, and/or unfolded away from this base for the same result.

According to a preferred characteristic of the disclosed embodiments, the anti-release element occupies only a portion of the width I of the opening between the rear end of the base and the holding element.

The anti-release element is preferably made of a material that has elastic deformation properties.

In an embodiment, the device has an internal element for attaching the base to the wall, integral with the base at its rear end.

For the base to receive the headband better, said base is preferably a plate formed to match locally the shape of the headset headband.

To reduce the risk of injury to the pilot, the external holding element preferably has a rounded contour.

In an improved embodiment, the base is at least partially retractable to the interior of a case of the device intended to be arranged in the thickness of the wall. The case is integral with the base at the rear end of said base. The base is preferably mounted to slide in said case forming a slide bar. The device also has automatic means for retracting the base into the case, preferably essentially completely, so that in the absence of external intervention and of the presence of a headset, the external holding element is brought to a distance from the rear end of the base corresponding to a width I of the opening at least smaller than the width of the headset headband intended to be held in the device, and which can be drawn out to deploy the base outside of the case so that the width I is at least greater than said width of the headband.

When the headband is positioned on the hook, the effect of retraction of the base into the case then produces a restraint of the headband between the external holding element and the wall, the effect of which is to hold the headband even more solidly on the hook.

In preferred embodiments of the disclosed embodiments, in the absence of a headset, when the base is essentially entirely brought into the case, the anti-release element is advantageously folded back between the external holding element and an internal element for attaching to the wall.

The disclosed embodiments also relate to a vehicle equipped on at least one wall with a device to support a headset as described above.

BRIEF DESCRIPTION OF THE DRAWINGS

A detailed description of the disclosed embodiments is given with reference to the Figures, which show.

DETAILED DESCRIPTION

A device according to the disclosed embodiments is intended to receive and support against a wall of a vehicle, a radio headset of a pilot who must keep it close to him when he is not wearing it.

In the description, the term headset is used to designate such a radio headset.

Figure 1:
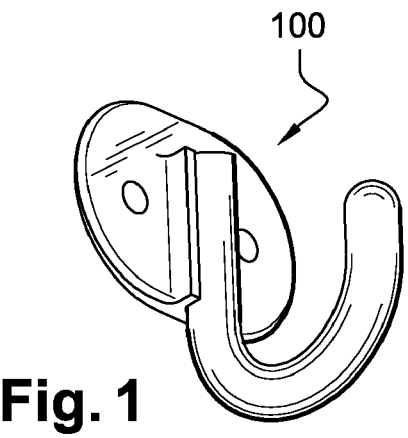
FIG. 1, already cited, an example of a device to support a headset pursuant to the prior art, FIG. 2, an illustration of a headset stowed in a support pursuant to a first embodiment of the disclosed embodiments, FIGS. 3a, b, c, various views of a first embodiment of the headset support pursuant to the disclosed embodiments, FIGS. 4a, b, c, various views of a second embodiment of a headset support pursuant to the disclosed embodiments, FIG. 5, an illustration of a headset stowed in a support pursuant to a second embodiment of the disclosed embodiments.
Figure 2:
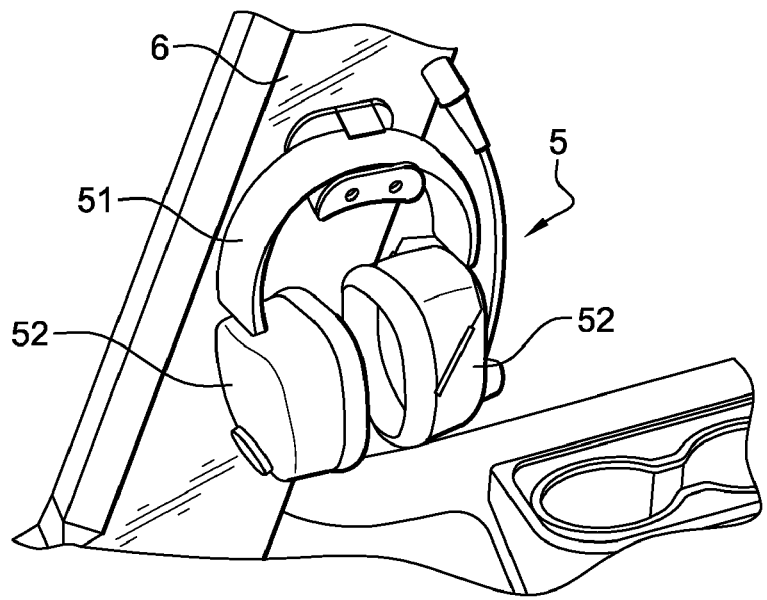

The headset 5, in a known manner and as illustrated in FIG. 2, has a headband 51 integral with two earphones 52, with the headband 51 being shaped to grip the pilot's head, so that each earphone is positioned to cover an ear.

Essentially for reasons of comfort, the headband 51 is relatively wide so as to present a contact area on the top of the head sufficiently large to carry the weight of the earphones without causing excessive pressure.

The examples of embodiment of the device shown in FIGS. 2 to 5 are described in the framework of a device intended to be attached to a wall 6 of a cockpit of an aircraft, for example as shown in FIG. 2 on the covering of a structural upright, but the disclosed embodiments are also applicable to any type of transport vehicle subject to external events, for example such as turbulence, vertical accelerations, and/or vibrations that may eject the headset from its support.

Figure 3A:
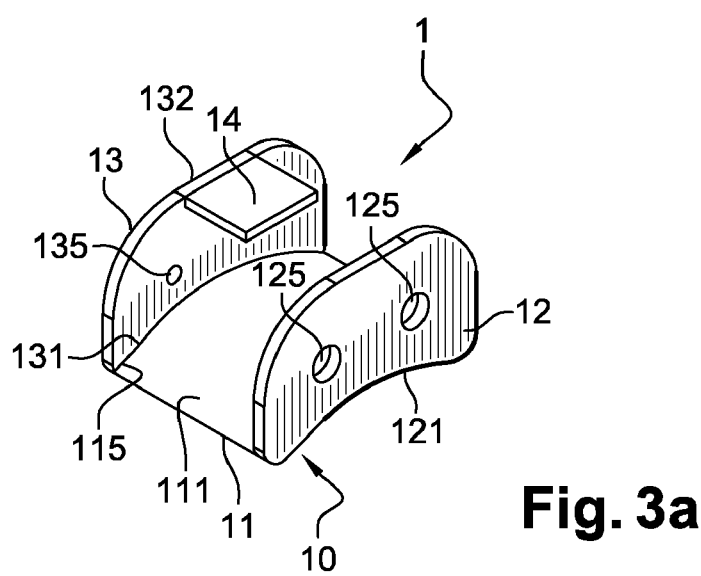
Figure 3B:
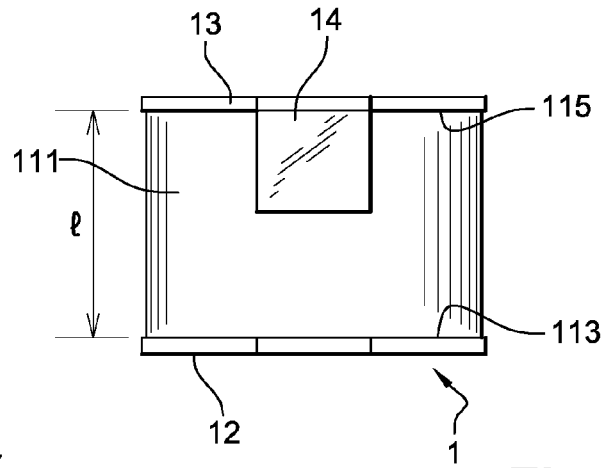
Figure 3C:
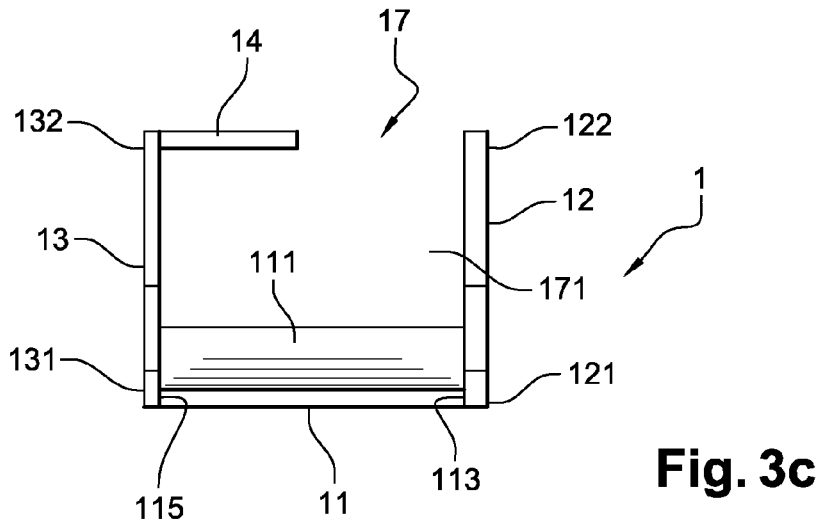

According to the disclosed embodiments, the device 1 to support a headset on a wall 6, as shown in FIGS. 3a to 3c which represent different views of a first mode of embodiment of a device (and in which the headset is not shown), comprises:
- a base that preferably has the form of a plate, called the receiving plate 11, that has a first face, called the receiving face 111, to receive an essentially central part of the headband 51 of the headset 5,
- an external element 12 that also preferably has the form of a plate to hold the central section of the headband on the receiving face 111, forming a stop when the headband moves on the receiving plate in a direction away from the wall 6, with the receiving plate and the external holding element together forming a hook 10.
- an internal element 13 preferably having the form of a plate for attaching the device 1 to the wall 6,
- an opening 17 to introduce or withdraw the headband from the receiving face 111, located between the external element 12 and the internal element 13.

In a view from above as shown in FIG. 3b, the receiving face preferably has an essentially rectangular shape of width I.

The external holding element 12 is integral at a first end 121 with a front end, called the first longitudinal margin 113, of the receiving plate 11.

The internal attaching element 13 is integral at a first end 131 with a rear end, called the second longitudinal margin 115, of the receiving plate 11, opposite the first longitudinal margin 113 along the width I.

In a non-limiting form of embodiment, to reduce the bulk of the device in the cockpit, the plates forming the internal element 13 and the external element 12 are essentially parallel to one another on both sides of the longitudinal margins 113, 115 of the receiving plate.

To avoid the risk of a release of the headset out of the device in case of turbulence or vertical acceleration, the device 1 advantageously also has an anti-release element 14 at a free end 132 of the internal element 13, opposite the first end 131, which obstructs completely or partially the opening 17, forming an at least partially closed housing 171 for the headset 5.

The anti-release element 14 has a stable position blocking an area at least large enough to prevent the passage of the headband 51 through the opening 17. The characteristics of said anti-release element, in particular its rigidity, are such that it remains in the stable blocking position when it is subjected to a force exerted by the headset under the effect of inertial forces, for example derived from turbulence. However, its characteristics are such that it can be moved by a manual action of the pilot into a releasing position that permits the passage of the headset headband through said opening.

The anti-release element 14 can be a strap, a free end of which opposite the end attached to the device 1, at the external holding element, is attached to the wall 6 by means of a pushbutton for example, so as to block the opening 17.

In an example of embodiment, the anti-release element is preferably made of a material that has elastic deformation properties, for example an elastomer. It has sufficient rigidity to prevent the release of the headset by itself out of the hook, but sufficiently weak to be able to introduce the headset manually into its housing in the hook, or to withdraw it by deforming said anti-release element.

In a preferred embodiment, the anti-release element 14 is a tongue extending into the stable blocking position essentially parallel to the receiving face 111, in a plane joining the free ends 132, 122, respectively, of the internal 13 and external 12 elements.

The anti-release element, for example, is made of an elastomeric material such as rubber, which can be deformed.

In another example of embodiment, the device 1 has spring-hing means at the free end 132 of the internal element 13, permitting the anti-release element 14 to tilt when pushed, and then to return to its initial stable blocking position when it is no longer being pushed.

The spring-hing means are calibrated so that a manual action can tilt the anti-release element without difficulty to introduce or extract the headset headband into or out of the device, but so that a force exerted by the headset headband under the effect of an acceleration cannot make the anti-release element tilt.

For convenient access by the pilot, the anti-release element 14 is positioned on the internal element 13, but said anti-release element can also be positioned on a free end 122 of the external element 12, opposite the first end 121, a method not shown.

To increase the area of contact of the headset on the device and thus to provide for better holding of the headset in position during different phases of flight, and under turbulent conditions, and to limit the risks of damaging the headband, the receiving face 111 preferably conforms in length to follow the rounded shape of the headband 51 of the headset 5.

To limit the risk of injury and/or shocks to the pilot, and to facilitate the passage of the headband when the headset is placed on or withdrawn from the device, the external element 12 preferably has a rounded contour.

The device 1 is attached to the wall 6 by any conventional means, especially by cementing or by screws.

In an example of embodiment in which the device is screwed to the wall, the internal element 13 has at least one attaching hole 135 through which a fastening screw can pass. The external element 12 has at least one hole 125, and preferably a number of holes identical to those of the holes 135 of the internal element 13, facing said holes 135 and with a diameter suitable for the passage of a screwdriver to tighten the fastening screw.

In FIGS. 3a to 3c, and without limiting the disclosed embodiments, the internal 13 and external 12 elements each have two holes for two screws to pass through, to attach the device to the wall.

Figure 4A:
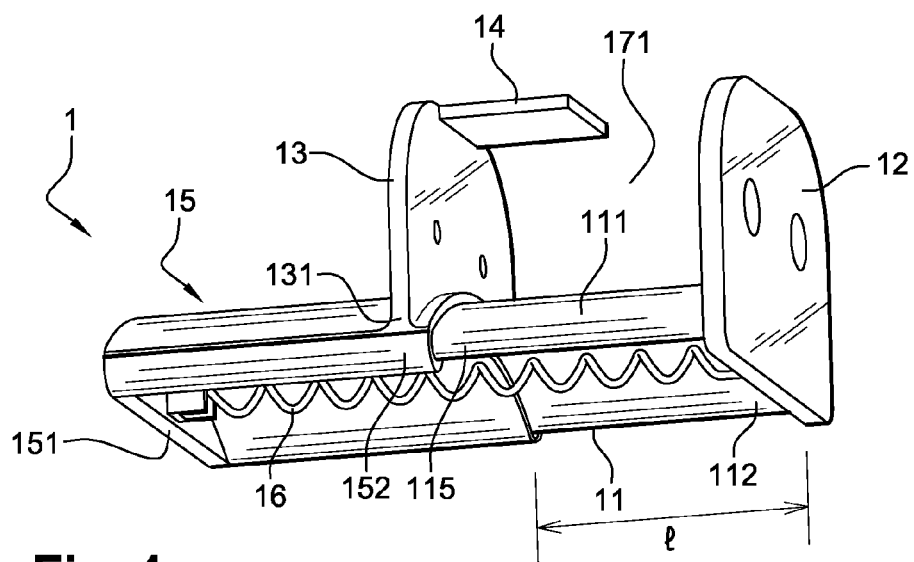
Figure 4B:
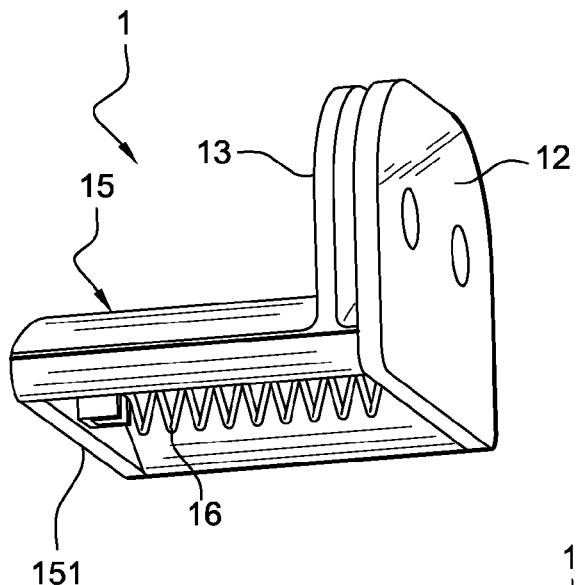
Figure 4C:
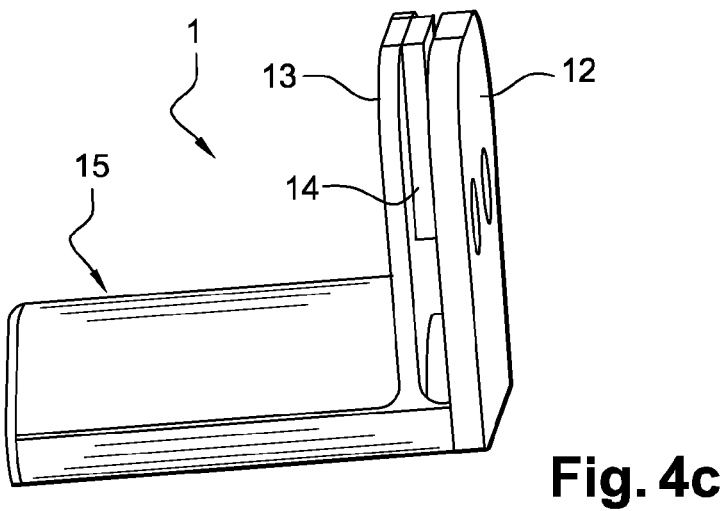
Figure 5:
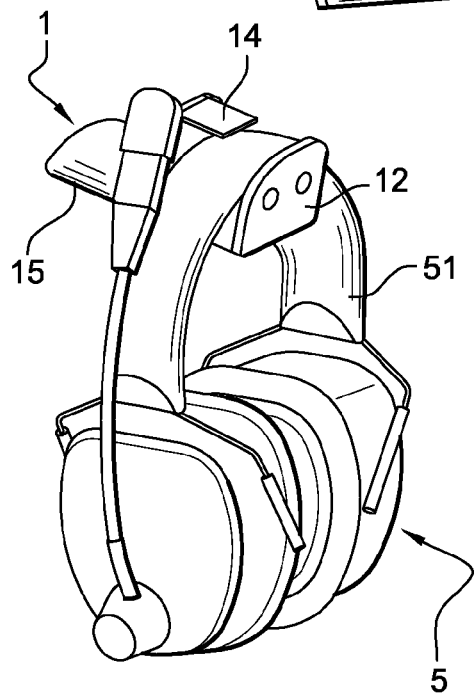

In an improved embodiment shown in FIGS. 4a to 5, the internal element 13 is no longer integral in a fixed manner with the second longitudinal margin 115 of the receiving plate 11, and the device 1 advantageously has means for sliding the receiving plate at the first end 131 of the internal element 13, for example a case 15, preferably essentially homothetic with the receiving plate 11. The case 15 is assembled at the second longitudinal margin 115 of the receiving plate and is made so that the receiving plate 11 is mounted to slide in the case, forming a slider. The receiving plate 11 is at least partially retractable into the interior of the case 15.

Thus the width I of the housing 171 is variable depending on the relative position of the receiving plate 11 with respect to the sliding means.

When the device 1 is attached to a wall 6, the case 15 is advantageously integrated into the thickness of said wall (not shown in the Figures), in particular in the covering of said wall.

The receiving plate 11 has a minimal dimension along the direction of sliding necessary to distance the external element 12 sufficiently from the internal element 13 so that the headband 51 of the headset 5 can be introduced through the opening 17, disabling the anti-release element as the case may be.

The device 1 also has automatic means 16 of retracting the receiving plate 11 essentially entirely integrated into the case 15, and capable of being stretched into a position out of the receiving plate to provide a width I between the internal and external elements at least equal to the width of the headband 51 of the headset 5. The automatic means of retraction 16, for example, are a return spring, and it is preferably placed beside a second face 112 of the receiving plate 11, opposite the receiving face 111, between a rear end 151 of the case, opposite a front end 152 integral with the internal element 13, and the external element 12.

Said automatic means of retraction 16 are in a retracted or slightly stretched position when the external element 12 is essentially against the internal element 13, when the headset is not placed on the device, and in a stretched position when the external element 12 is at a distance from said internal attaching element 13, in particular when the headset is placed on the device.

In the retracted position, the internal 13 and external 12 elements are close together under the effect of the means of retraction 16, and said external element is held at a stop, in the configuration shown, against the anti-release element 14.

In a preferred embodiment that minimizes the dimensions of the device when the headset is withdrawn, the anti-release element 14 is placed in a folded position so that the internal 13 and external 12 elements are separated essentially by the thickness of the anti-release element 14, which has been folded against the internal attaching element, advantageously under the action of the external element 12.

The anti-release element 14 preferably has a slight inclination relative to the internal attaching element 13, toward the receiving face 111, to facilitate the folding of said anti-release element when the external element 12 returns toward the internal element 13 under the effect of the automatic means of retraction 16.

The automatic means of retraction 16 are chosen so that a manual action can separate the external element 12 from the internal element 13 without difficulty, to introduce the headset headband into the housing 15, but also so that said automatic means of retraction cannot be extended and separate the external element 12 under the effect of turbulence alone, including when a headset is placed on the device.

The pulling forces to be exerted are advantageously such that they can be exerted without difficulty using only one hand, to pull the external element 12.

In an embodiment, the second face 112 of the receiving plate 11 is shaped to be essentially identical with the receiving face 111 so as to lodge and mask the automatic means of retraction 16 beneath the rounded section.

When the pilot uses his headset, the device 1 is in a position called the retracted position. The external element 12 is as close as possible to the internal element 13, as shown in FIGS. 4b and 4c.

When the pilot places his headset on the device 1, he pulls on the external element 12. The automatic means of retraction 16, which hold the external element 12 essentially against the internal element 13, are stretched.

Simultaneously with the distancing of the external element 12 from the internal element 13, the anti-release element 14 returns to its initial position blocking the housing 171.

The pilot moves the external element 12 far enough away so that the opening 17, combined with an at least partial disabling of the anti-release element 14 as the case may be, is large enough to permit the introduction of the headband 51 into the housing 171.

When the opening is large enough, while retaining the external element 12 in position, the pilot introduces the headband 51 into the opening 17.

When the headband 51 is placed on the receiving face 111 of the device 1, the pilot releases the external element 12. The automatic means of retraction 16 tend to bring together again the internal 13 and external 12 elements until they are immobilized relative to one another by the headband, as shown in FIG. 5.

The automatic means of retraction 16, to complement the anti-release element 14, thus provide an improvement of the quality of the holding of the headband 51 in the housing 15.

This embodiment, besides improving the holding of the headset in the device, also advantageously provides for reducing the bulk of the device when said device is not supporting the headset. This reduction of bulk, on the one hand, provides for limiting the risk of injury and/or blows on the head during motions in an area close to the device, and on the other hand, it makes the device more robust while reducing the risk of deterioration of the device under the effect of shocks.

This embodiment also advantageously provides for adapting the device to different widths of the headset headband, while retaining the efficacy of the anti-release element.

The disclosed embodiments are not limited to the examples described above. A person skilled in the art is able to adapt the shapes and cross sections of the elements of the device to shapes and cross sections not described.

The device according to the disclosed embodiments thus permits a pilot to stow his headset securely when he so desires.

The invention claimed is:

1. Device to support a headset along a wall of a vehicle, comprising:
    a base with a receiving face for receiving a headband of the headset, with said base being intended to be attached transversally to the wall by an internal element and being integral at an opposite front end with an external element for holding said headband on said base;
    a hook formed from the base and the external element, having an opening between the internal and external elements with a width I at least equal to a width of the headband, permitting passage of said headband toward the base or a removal from said base;
    an anti-release element having a stable position blocking the opening over at least a portion of the width I sufficient to prevent the passage of the headband, when it is placed on the base, out of the device through the opening, in case of turbulence or vertical acceleration, with said anti-release element being able to be moved by a manual action directly on said anti-release element or through the headset, into a releasing position to permit said passage; and
    a means for retraction placed beside a second face of the base opposite the receiving face, and fastened to a rear end of the device and to the external element.

2. Device according to claim 1 wherein the anti-release element is a tongue extending essentially parallel to the base.

3. Device according to claim 1 in which the anti-release element is able to be folded toward the base so as to free said opening.

4. Device according to claim 1 wherein the anti-release element occupies a portion of the width I of the opening between the internal element and the external element.

5. Device according to claim 1 wherein the anti-release element is made of a material that has elastic deformation properties.

6. Device according to claim 1 wherein the base is a plate shaped to follow locally the shape of the headband of the headset.

7. Device according to claim 1 wherein the external element has a rounded contour.

8. Device according to claim 1 wherein the base is at least partially retractable to the interior of a case for said device intended to be arranged in the thickness of the wall, with said case being integral with the internal element, and wherein said means of retraction operates to bring the external holding element to a distance from said internal element in the absence of external action and in the presence of a headset, that corresponds to a width of the opening at least less than the width of the headband of the headset intended to be held in said device, and that can be stretched so as to deploy said base outside of the case so that the said width I has at least the said width of the headband.

9. Vehicle equipped on at least one wall with a device according to claim 1.

* * * * *